(12) United States Patent
Oikawa

(10) Patent No.: US 8,873,414 B2
(45) Date of Patent: Oct. 28, 2014

(54) COMMUNICATION APPARATUS, COMMUNICATION METHOD, AND COMMUNICATION SYSTEM

(75) Inventor: Tomoya Oikawa, Tokyo (JP)

(73) Assignee: Sony Corporation, Tokyo (JP)

( * ) Notice: Subject to any disclaimer, the term of this patent is extended or adjusted under 35 U.S.C. 154(b) by 357 days.

(21) Appl. No.: 13/473,157

(22) Filed: May 16, 2012

(65) Prior Publication Data

US 2012/0314595 A1      Dec. 13, 2012

(30) Foreign Application Priority Data

Jun. 10, 2011  (JP) ................. 2011-130655

(51) Int. Cl.
*H04L 12/26*     (2006.01)
*H04L 1/00*      (2006.01)
*H04L 12/18*     (2006.01)
*H04L 1/18*      (2006.01)
*H04W 28/24*     (2009.01)
*H04W 4/06*      (2009.01)
*H04W 76/00*     (2009.01)

(52) U.S. Cl.
CPC .............. *H04L 1/00* (2013.01); *H04L 12/1863* (2013.01); *H04W 4/06* (2013.01); *H01L 1/0002* (2013.01); *H04W 76/002* (2013.01); *H04L 1/0015* (2013.01); *H04L 2001/0093* (2013.01); *H04L 1/18* (2013.01); *H04W 28/24* (2013.01)
USPC ......................................... 370/252; 370/312

(58) Field of Classification Search
USPC ....................................................... 370/252
See application file for complete search history.

(56) References Cited

U.S. PATENT DOCUMENTS

2006/0218264 A1* 9/2006 Ogawa et al. ................. 709/223
2009/0147734 A1* 6/2009 Naka et al. .................... 370/329
2009/0196237 A1* 8/2009 Jonsson ........................ 370/329
2011/0122804 A1* 5/2011 Iyer et al. ...................... 370/311
2011/0194650 A1* 8/2011 Lee et al. ...................... 375/316
2011/0211517 A1* 9/2011 Moscibroda et al. ......... 370/312
2011/0305161 A1* 12/2011 Ekpenyong et al. .......... 370/252

FOREIGN PATENT DOCUMENTS

JP       2010-161554        7/2010

OTHER PUBLICATIONS

U.S. Appl. No. 13/476,507, filed May 21, 2012, Oikawa.

* cited by examiner

*Primary Examiner* — Wanda Z Russell
(74) *Attorney, Agent, or Firm* — Oblon, Spivak, McClelland, Maier & Neustadt, L.L.P.

(57) ABSTRACT

A communication apparatus that receives, from a plurality of other communication apparatuses, information indicating communication quality of a multicast transmission transmitted from the communication apparatus to each of the plurality of other communication apparatuses; and controls a multicast transmission rate to be lowered if a communication quality of a first one of the plurality of other communication apparatuses is less than a predetermined threshold and a communication quality of a second one of the other plurality of other communication apparatuses is greater than the predetermined value.

20 Claims, 6 Drawing Sheets

COMMUNICATION APPARATUS, COMMUNICATION METHOD, AND COMMUNICATION SYSTEM

CROSS REFERENCE TO RELATED APPLICATIONS

This application claims the benefit of priority under 35 U.S.C. §119 to Japanese Priority Patent Application JP 2011-130655 filed in the Japan Patent Office on Jun. 10, 2011, the entire contents of which is hereby incorporated by reference.

BACKGROUND

The present disclosure relates to a communication apparatus and a communication method performing multicast transmission of the same data with respect to a plurality of receiving terminals, and in particular, to a communication apparatus and a communication method dynamically optimizing the multicast transmission rate, as well as a communication system.

As typical wireless LAN (Local Area Network) methods of communication, unicast communication transmitting data to a single terminal and multicast communication transmitting the same data to a plurality of terminals may be exemplified. In multicast communication, the same data may be transmitted at one time to a plurality of receiving terminals, whereby it is possible to reduce the use of transmission bandwidth. For example, in a case where a large amount of data such as a video is transmitted wirelessly, multicast communication is considered to be effective when the wireless communication transmission capacity is increased.

Here, in typical wireless communication, when the distance between transmission and reception is short (good communication quality), communication is performed at a high speed transmission rate, and when the distance between transmission and reception is long (poor communication quality), communication is performed after switching to a low speed transmission rate. For example, in a wireless LAN system including an access point (AP) and a client station (STA), a plurality of transmission rates are prescribed in order to communicate efficiently with a wide service area.

However, when performing multicast transmission of multicast data from the access point AP to a plurality of client stations configuring a multicast group, the slowest transmission rate is often selected. This is because multicast communication is different from unicast communication and there is no retransmission mechanism. Without information on whether a packet is transmitted correctly being returned from each client station, even if a packet from the access point AP is not transmitted correctly, it is difficult to perform retransmission.

FIG. 8 shows a situation of performing multicast transmission from one multicast transmission station (hereinafter, simply referred to as "transmission station") to a plurality (four in the illustrated example) of multicast reception stations (simply referred to as "reception station") 1 to 4.

For example, in wireless LAN systems in infrastructure mode, the access point AP becomes a multicast transmission station and each client station STA accommodated in a service area may become a multicast reception station. However, in a wireless system in which there is no control station such as an access point AP in ad-hoc mode or the like, arbitrary communication stations may become multicast transmission stations and multicast reception stations.

In the example shown in FIG. 8, the transmission station selects the lowest transmission rate R1 and the data signal (multicast data) is transmitted. Thus, the multicast data is delivered even at a reception station 3 for which the reception level is low at the end of the service area of the transmission station and for which the communication quality is poor. However, when multicast data of a large data size is generated at the transmission station, since the multicast data is buffered and the transmission rate is low, the time during which the wireless bandwidth is occupied becomes long. At this time, in a case where unicast communication such as of sound or images is performed between the transmission station and the other reception stations 1, 2, and 4 where the transmission quality is good, unicast data loss occurs, and a situation in which transmission efficiency is significantly reduced may occur.

On the other hand, when the multicast transmission rate is increased, since the time during which multicast transmission occupies the wireless bandwidth does not become long, the opportunity to transmit unicast data such as of sound or images is increased and loss is eliminated. FIG. 9 shows a situation of performing multicast transmission from one transmission station to a plurality of reception stations 1 to 4 at a transmission rate R2 (R2>R1) higher than the lowest transmission rate R1. In this case, the reception station 4 for which the reception level is low at the end of the service area of the transmission station and the communication quality is poor may not receive the multicast data at the transmission rate R2. In addition, since the reception station 4 does not return a reception acknowledgement ACK corresponding to the multicast data, the transmission station may not detect non-delivery of the multicast data due to the degradation of the communication quality.

In short, when the multicast transmission rate is fixed at the slower rate side, the time during which the wireless bandwidth is occupied becomes long, whereby there is a problem in that the overall transmission efficiency of the system is deteriorated. Conversely, when the multicast transmission rate is fixed at the higher rate side, there are problems in that the communication quality is degraded and the non-delivery of the multicast data at the reception station may not be detected.

Incidentally, a transmission station apparatus which dynamically sets the multicast transmission rate and a wireless communication system have been proposed. The transmission station apparatus periodically transmits a pseudo training signal at a predetermined multicast transmission rate using unicast or multicast to each of a plurality of transmission station apparatuses and receives ACK responses from the plurality of transmission station apparatuses with respect to the pseudo training signal. Then, the transmission station apparatus varies the multicast transmission rate according to the presence or absence of the ACK responses from the plurality of reception station apparatuses and repeats the unicast transmission of the pseudo training signal. When there are ACK responses from all of the plurality of reception station apparatuses, the multicast transmission rate is selected as a predetermined multicast transmission rate (for example, refer to Japanese Unexamined Patent Application Publication No. 2010-161554).

In the above wireless communication system, when a pseudo training signal is transmitted by unicast transmission, even in a state where the communication quality is degraded, there are times when data is delivered to the reception station apparatus by the retransmission control function. As a result, it is determined that the communication quality is better than it actually is, whereby there is a tendency to select a high multicast transmission rate. Meanwhile, the retransmission control in the multicast transmission typically does not function. Since the pseudo training signal is delivered to the reception station apparatus according to this difference, the unicast transmission rate at that time is selected as a predetermined multicast transmission rate. In such a case, even when transmission is performed using multicast, a situation in which the multicast data is not delivered may occur.

On the other hand, in a case where the pseudo-training signal is transmitted by multicast transmission, the transmission is only performed periodically at a predetermined cycle. Therefore, in a wireless transmission path in which link loss is generated at a certain frequency, a situation may occur in which a pseudo training signal may not be received due to the momentarily poor communication quality. As a result, even though the bandwidth is sufficient, a low multicast transmission rate may be set, and there is a problem in that the overall transmission efficiency of the system is deteriorated.

In addition, in the wireless communication system described above, even when there is a priority among the plurality of reception stations, if degradation of the communication quality occurs in part of the reception station apparatus where the priority is low, the multicast transmission rate is deteriorated even with respect to many other reception station apparatuses in a favorable communication environment.

In addition, in the above wireless communication system, the channel quality is estimated using the pseudo-training signal. For this reason, other than at the moment of training, the transmission station apparatus may not dynamically optimize the multicast transmission rate in relation to changes of communication quality or the like caused by ongoing variations of the propagation environment on the reception station apparatus side. In other words, even if there are variations in the communication environment during multicast transmission at each reception station configuring the multicast group, the transmission station apparatus may not correspond thereto.

SUMMARY

It is desirable to provide a superior communication apparatus, communication method, and communication system, which are capable of setting an appropriate transmission rate and performing multicast transmission.

It is desirable to provide a superior communication apparatus, communication method, and communication system, which are capable of dynamically optimizing the multicast transmission rate in response to changes of communication quality or the like caused by ongoing variations of the propagation environment.

It is desirable to provide a superior communication apparatus, communication method, and communication system, which are capable of dynamically optimizing the multicast transmission rate in response to changes of communication quality or the like caused by ongoing variations of the propagation environment in a plurality of reception stations set with respective priorities.

The present disclosure is made by taking the above problems into consideration.

According to a first embodiment, the disclosure is directed to a communication apparatus that receives, from a plurality of other communication apparatuses, information indicating communication quality of a multicast transmission transmitted from the communication apparatus to each of the plurality of other communication apparatuses; and controls a multicast transmission rate to be lowered if a communication quality of a first one of the plurality of other communication apparatuses is less than a predetermined threshold and a communication quality of a second one of the other plurality of other communication apparatuses is greater than the predetermined value.

According to another embodiment, the disclosure is directed to a communication apparatus that receives a multicast transmission from a second communication apparatus; determines information indicating communication quality of the multicast transmission received from the second communication apparatus; and transmits the information to the second communication apparatus, which lowers a multicast transmission rate if the communication quality of the communication apparatus is less than a predetermined value and a communication quality reported by a third communication apparatus to the second communication apparatus is greater than the predetermined value.

According to another embodiment, the disclosure is directed to a communication system that includes a plurality of first communication apparatuses that each receive a multicast transmission from a second communication apparatus; determine information indicating communication quality of the multicast transmission received from the second communication apparatus; and transmit the information to the second communication apparatus. The second communication apparatus in the system receives the information from each of the plurality of first communication apparatuses; and controls a multicast transmission rate to be lowered if a communication quality of a first one of the plurality of first communication apparatuses is less than a predetermined threshold and a communication quality of a second one of the plurality of first communication apparatuses is greater than the predetermined value.

However, the term "system" used here refers to something in which a plurality of apparatuses (or modules implementing a specific function) is logically assembled and it does not particularly matter if each apparatus or functional module is within a single housing or not.

According to the technique described herein, there is provided a superior communication apparatus, communication method, and communication system, which are capable of dynamically optimizing the multicast transmission rate in response to changes of communication quality or the like caused by ongoing variations of the propagation environment in a plurality of reception stations set with respective priorities.

According to the technique disclosed herein, even in a case where communication quality deterioration occurs at a part of reception stations where the transmission priority is low between a transmission station and a plurality of reception stations configuring a multicast group, it is possible to maintain transmission efficiency without reducing the multicast transmission rate with respect to many other client stations in a favorable communication environment.

Other objects, features and advantages of the techniques described herein will become apparent from the more detailed description based on the embodiments and accompanying drawings described below.

DETAILED DESCRIPTION OF EMBODIMENTS

Below, embodiments of the technique described in the present disclosure are explained in detail with reference to the drawings.

As an embodiment of the wireless communication system performing multicast transmission relating to the technique described in the present disclosure, a wireless LAN system may be exemplified. That is, in a wireless LAN system in an infrastructure mode, an access point AP becomes a multicast transmission station and each client station STA accommodated in a service area may become a multicast reception station.

Here, each client station that configures the multicast group is set with a respective priority. As specific examples thereof, a wireless LAN system installed in a production site of moving image data such as a broadcasting station may be exemplified. That is, an image captured by a camera is transmitted from the multicast transmission station and each monitor displaying the captured image on a screen received multicast data as a multicast reception station. A high priority is set for monitors assigned to those for whom viewing the captured image is important, such as a director. On the other hand, a low priority is set for monitors assigned to those in a position where viewing the captured image is discretionary, such as an actor. Furthermore, it may be considered that the priority may be further subdivided according to the casting. Below, in the multicast group, a client station with a higher (or the highest) transmission priority is also called a "priority terminal". Furthermore, in the multicast group, a client station (for which the transmission priority is low) other than the priority terminal is also called a "non-priority terminal".

In addition, each client station configuring the multicast group receives multicast data and also returns feedback information relating to the communication quality of the multicast data respectively received at a predetermined cycle.

Below, description is given of a case where a multicast transmission rate is dynamically set in a period when multicast transmission of multicast data is performed from an access point AP to a plurality of client stations configuring a multicast group.

Figure 1:
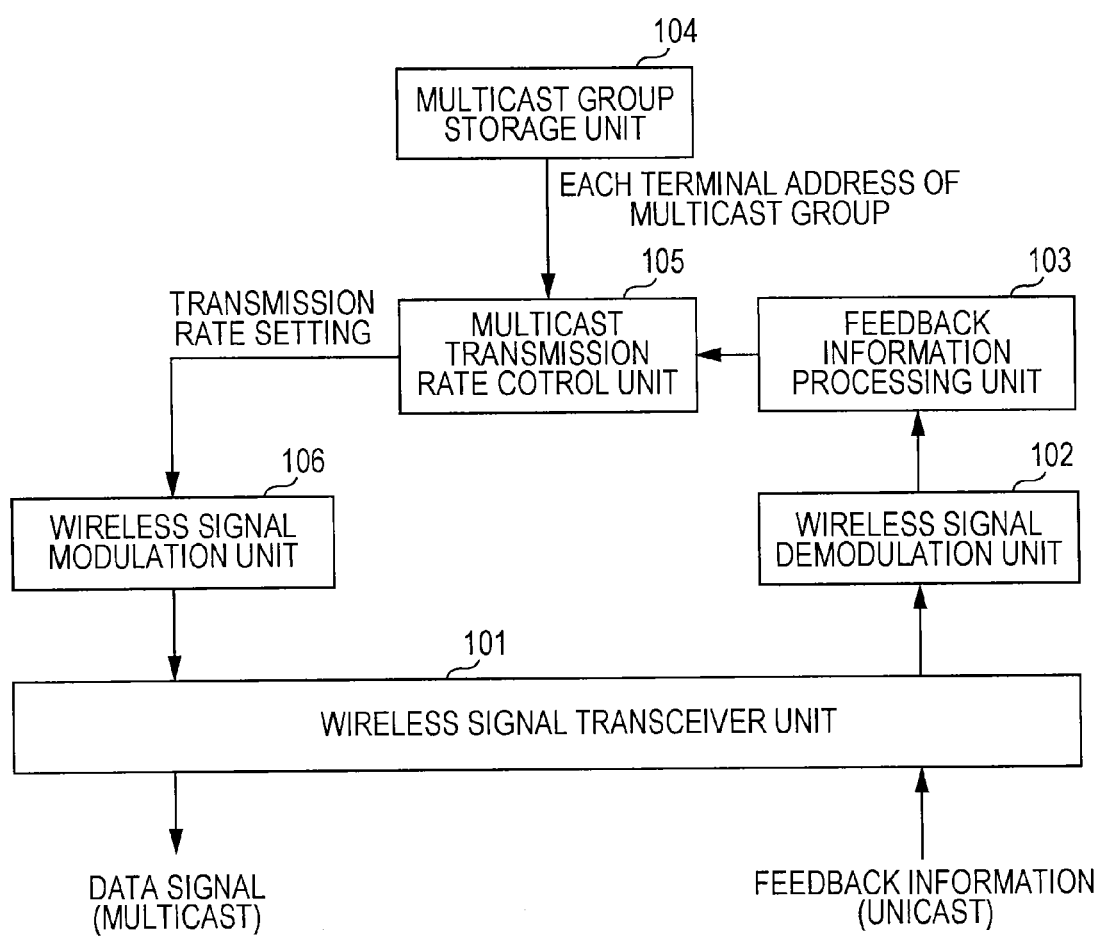
FIG. 1 is a diagram schematically showing a functional configuration for an access point AP in a wireless LAN system to determine the optimum value of a multicast transmission rate according to the communication quality of each wireless reception station.

FIG. 1 schematically shows a functional configuration for an access point AP in a wireless LAN system to determine the optimum value of a multicast transmission rate according to the communication quality of each wireless reception station. The shown access point AP is provided with a wireless signal transceiver unit 101, a wireless signal demodulation unit 102, a feedback information processing unit 103, a multicast group storage unit 104, a multicast transmission rate control unit 105, and a wireless signal modulation unit 106.

The wireless signal transceiver unit 101 sequentially receives feedback information on the multicast transmission transmitted periodically from each of the client stations that configure the multicast group and sends the feedback information to the wireless signal demodulation unit 102.

The wireless signal demodulation unit 102 extracts the data from the wireless signal and sends the data to the feedback information processing section 103.

The feedback information processing section 103 extracts the feedback information relating to the communication quality from the respectively received data of the plurality of wireless reception stations and provides notification of the values to the multicast transmission rate control unit 105.

In the wireless LAN system, the kind of information used as feedback information relating to communication quality is arbitrary. As one index indicating the deterioration of the quality of the propagation channel, packet loss rate (PLR) is widely known. Below, description is given with the arrival rate of packets (=1-PLR) transmitted using multicast set as feedback information so that a higher value indicates a more favorable communication quality.

The multicast transmission rate control unit 105 determines whether each wireless reception station satisfies a predetermined communication quality from each terminal address of the multicast group from the multicast group storage unit 104 and the feedback information acquired from each of the plurality of wireless reception stations. Then, the multicast transmission rate control unit 105 determines the optimal value of the multicast transmission rate according to the determination result and sets the value for the wireless signal modulation unit 106. The details of the processing procedure for determining the optimal value of the multicast transmission rate in the multicast transmission rate control unit 105 are described below.

The wireless signal modulation unit 106 sets the multicast transmission rate for which notification is provided from the multicast transmission rate control unit 105 for the wireless signal transceiver unit 101. In this manner, multicast transmission from the wireless signal transceiver unit 101 to each client station is performed using the set multicast transmission rate.

Figure 2:
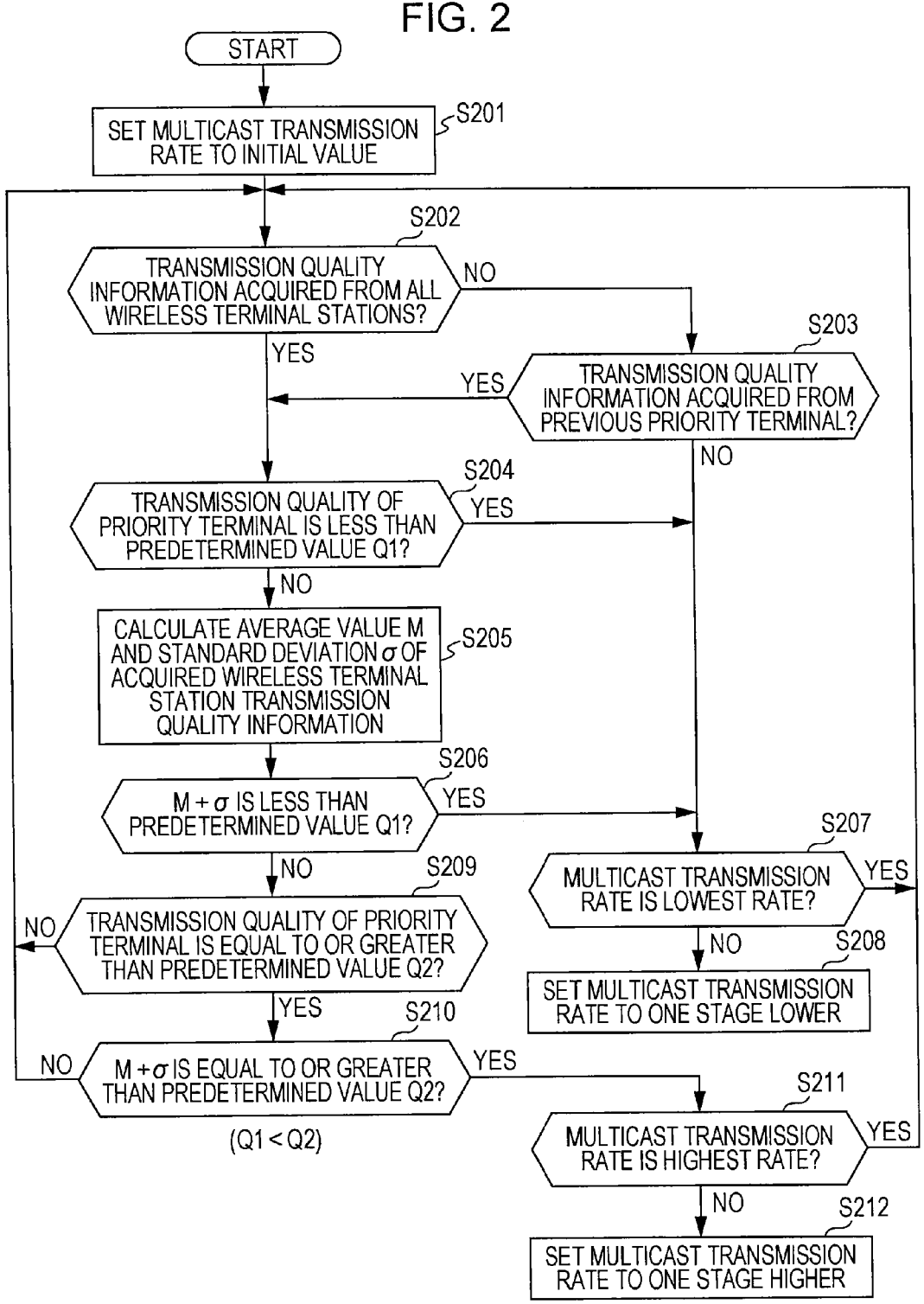
FIG. 2 is a flowchart showing a processing procedure performed in the multicast transmission rate control unit for determining the optimum value of the multicast transmission rate according to the communication quality of each wireless reception station.

In FIG. 2, a processing procedure performed in the multicast transmission rate control unit 105 for determining the optimum value of the multicast transmission rate according to the communication quality of each wireless reception station is shown in a flowchart format.

First, the multicast transmission rate control unit 105 sets the initial value of the multicast transmission rate to be used when performing multicast transmission (step S201).

Each client station configuring the multicast group returns feedback information relating to the communication quality of the multicast data respectively received at a predetermined cycle. Then, the multicast transmission rate control unit 105 determines whether feedback information is received from all the client stations configuring the multicast group, that is, whether or not the communication quality information of all the client stations is acquired (step S202). Here, as feedback information, the packet arrival rate (=1-PLR) is used (see above).

In addition, the multicast transmission rate control unit 105 provides a time-out in step S202. When a response may not be received from all the client stations configuring the multicast group until a certain time passes from the start of the process of step S202, it is determined that the predetermined communication quality (Q1) is not satisfied in at least one of the client stations.

When feedback information from at least one client station was not received and it was difficult to acquire communication quality information of all the client stations configuring the multicast group (No in step S202), the multicast transmission rate control unit 105 further determines whether feedback information from all the priority terminals is received, that is, whether or not communication quality information of all the priority terminals is acquired (step S203).

Then, when feedback information from at least one priority terminal was not received and it was difficult to acquire communication quality information of all the priority terminals (No in step S203), in order to prioritize the acquisition of the feedback information from the priority terminals, the multicast transmission rate control unit 105 sets the multicast transmission rate only one stage lower (step S208) upon determining that the currently set multicast transmission rate is not the lowest rate (No in step S207). In addition, when the currently set multicast transmission rate is the lowest rate (Yes in step S207), the multicast transmission rate control unit 105 returns to step S202.

On the other hand, when it was possible to acquire communication quality information of all the client stations configuring the multicast group (Yes in step S202), or it was possible to acquire communication quality information of all the priority terminals (Yes in step S203), the multicast transmission rate control unit 105 proceeds to the next step S204.

In step S204, the multicast transmission rate control unit 105 determines whether or not the packet arrival rate as communication quality information is less than a predetermined value Q1 in at least one of the priority terminals.

When the communication quality information of at least one of the priority terminals is less than the predetermined value Q1 (Yes in step S204), in order to prioritize improvement of the multicast data communication quality to the priority terminal, the multicast transmission rate control unit 105 sets the multicast transmission rate only one stage lower (step S208) upon determining that the currently set multicast transmission rate is not the lowest rate (No in step S207). In addition, when the currently set multicast transmission rate is the lowest rate (Yes in step S207), the multicast transmission rate control unit 105 returns to step S202.

In this manner, by repeating a process in which the multicast transmission rate is deteriorated when the communication quality of the multicast transmission is less than a predetermined value Q1 in at least a part of the priority terminals, it is possible to set a multicast transmission rate in which the communication quality of the multicast transmission satisfies the predetermined value Q1 in all the priority terminals.

Meanwhile, when the communication quality information of all the priority terminals is equal to or more than the predetermined value Q1 (No in step S204), the multicast transmission rate control unit 105 proceeds to the next step S205.

After step S205, the multicast transmission rate control unit 105 performs a process taking non-priority terminals in the multicast group into consideration. Specifically, the average value M of the communication quality information that was obtained from the client stations configuring the multicast group and the standard deviation $\sigma$ are calculated (step S205). Subsequently, it is determined whether or not $M-K_1\sigma$ is less than the predetermined value Q1 (step S206). Here, $K_1$ is an integer. The process performed in step S206 corresponds to determining whether or not the client stations in which the communication quality satisfies the predetermined value Q1 in the multicast group are a predetermined ratio or more.

Here, when $M-K_1\sigma$ is less than the predetermined value Q1 (Yes in step S206), in consideration of improving the communication quality of multicast data to non-priority terminals as well as priority terminals, the multicast transmission rate control unit 105 sets the multicast transmission rate only one stage lower (step S208) upon determining that the currently set multicast transmission rate is not the lowest rate (No in step S207). In addition, when the currently set multicast transmission rate is the lowest rate (Yes in step S207), the multicast transmission rate control unit 105 returns to step S202.

Meanwhile, in a case where $M-K_1\sigma$ is equal to or greater than a predetermined value Q1 (No in step S206), it is determined that the variation in the communication quality of the non-priority terminals is small. Therefore, the multicast transmission rate control unit 105 proceeds to the next step S209 without performing deterioration of the multicast transmission rate.

In step S209, the multicast transmission rate control unit 105 determines whether or not the packet arrival rate as communication quality information in all the priority terminals is equal to or more than a predetermined value Q2 (here, Q2>Q1).

When communication quality information of at least one priority terminal is less than a predetermined value Q2 (No in step S209), if considered together with the determination result in step S204, the currently set multicast transmission rate may be considered as appropriate with respect to the communication quality in the priority terminals. Therefore, the multicast transmission rate control unit 105 returns to step S202 without change.

Meanwhile, when the communication quality information in all of the priority terminals is equal to or more than the predetermined value Q2 (Yes in step S209), it is estimated that the reception level in all of the priority terminals is sufficiently high. In such a case, the multicast transmission rate control unit 105 further determines whether or not $M-K_2\sigma$ is not equal to or more than the predetermined value Q2 (step S210) (here, Q2>Q1), using the average value M and standard deviation $\sigma$ of the communication quality information in the multicast group calculated in step S205. The process performed in step S210 corresponds to determining whether or not the client stations in which the communication quality satisfies the predetermined value Q2 in the multicast group are a predetermined ratio or more.

Here, when $M-K_2\sigma$ is less than the predetermined value Q2 (No in step S210), if considered together with the determination result in step S206, the currently set multicast transmission rate may be considered as appropriate with respect to the communication quality in the client stations of a predetermined ratio or more in the multicast group. Therefore, the multicast transmission rate control unit 105 returns to step S202 without change.

Meanwhile, when $M-K_2\sigma$ is equal to or more than a predetermined value Q2 (Yes in step S210), it is estimated that the reception level in all of the client stations of a predetermined ratio or more in the multicast group is sufficiently high. In such a case, by raising the multicast transmission rate one stage only (step S212) upon determining that the currently set multicast transmission rate is not the highest rate (No in step S211), the multicast transmission rate control unit 105 shortens the time for which the wireless bandwidth is occupied by the multicast transmission and promotes improvement in the transmission efficiency of the whole system. Further, when the currently set multicast transmission rate is the highest rate (Yes in step S211), the multicast transmission rate control unit 105 returns to step S202.

In addition, the multicast transmission rate control section 105 periodically performs the process of step S202 at a predetermined cycle.

As described above, the access point AP performs control of the multicast transmission rate so as to guarantee the communication quality of the client stations of a predetermined ratio or more in the multicast group while securing the communication quality in the priority terminals.

In the wireless LAN system according to the present embodiment, it has already been described that it is possible to use the packet arrival rate (=1-PLR) as an index of communication quality. In addition to the packet arrival rate, the received signal strength of the multicast data received in the client stations (Received Signal Strength Indication: RSSI) [dBm] or the like may also be used. In addition, two or more indexes such as the packet arrival rate and the received signal strength may be combined so as to create a communication quality index. Furthermore, it may be set so that feedback is given to the access point AP using different types of communication quality index for each client station.

Figure 3:
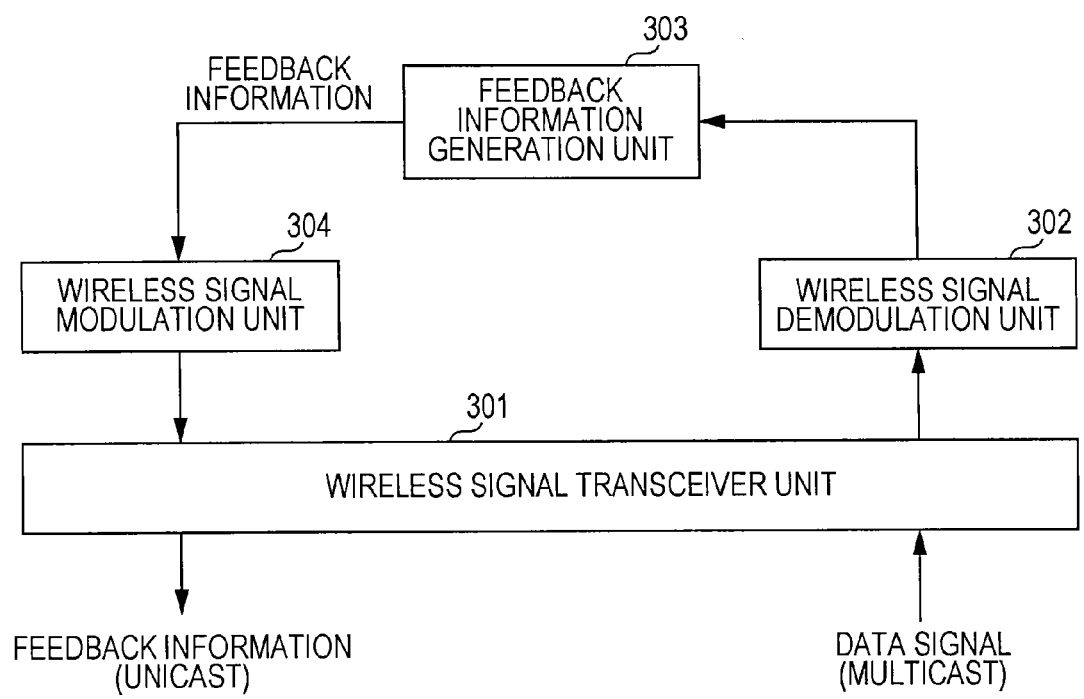
FIG. 3 is a diagram schematically showing a functional configuration for a client station configuring a multicast group in a wireless LAN system to return feedback information.

FIG. 3 schematically shows a functional configuration for a client station configuring a multicast group in a wireless LAN system to return feedback information. The shown client station is provided with a wireless signal transceiver unit 301, a wireless signal demodulation unit 302, a feedback information generation unit 303, and a wireless signal modulation unit 304. Typically, the client station does not send an ACK response with respect to multicast signals.

The wireless signal transceiver unit 301 receives the multicast signal from the access point AP and sends the signal to the wireless signal demodulation unit 302. Then, the wireless signal demodulation unit 302 demodulates the data from the multicast signal.

In addition, the wireless signal transceiver unit 301 or the wireless signal demodulation unit 302 measures the communication quality with respect to the multicast transmission and provides notification thereof to the feedback information generation unit 303. In this embodiment, the wireless signal demodulation unit 302 measures the total number of packets sent from the wireless signal transceiver unit 301 and the number of packets which were not demodulated as information relating to communication quality with respect to the multicast transmission, and provides notification thereof to the feedback information generation unit 303.

The feedback information generation unit 303 calculates the packet loss rate PLR per unit of time based on the data reported by the wireless signal demodulation unit 302, generates feedback information such as the packet arrival rate (1-PLR), and periodically sends the feedback information to the wireless signal modulation unit 303.

The wireless signal modulation unit 304 modulates the feedback information. Then, the wireless signal transceiver unit 301 periodically returns the feedback information to the access point AP by unicast transmission.

Here, it has already been described that each client station configuring the multicast group returns feedback relating to the communication quality of the respective multicast transmissions at a predetermined cycle. By performing carrier sensing and backoff control, each client station respectively returns feedback information to the access point AP at timings that do not conflict with each other. Since carrier sensing and backoff control are well-known techniques in the field, detailed description thereof is omitted in this specification.

In addition, in addition to the arrival rate of packets transmitted by multicast, each client station may measure the received signal strength (RSSI) of received multicast data in the client stations and transmit the result as feedback information relating to the communication quality of the multicast transmission. In addition, two or more indexes such as the packet arrival rate and the received signal strength may be combined so as to create feedback information. Furthermore, it may be set so that feedback is given to the access point AP using different types of communication quality index for each client station.

Figure 4:
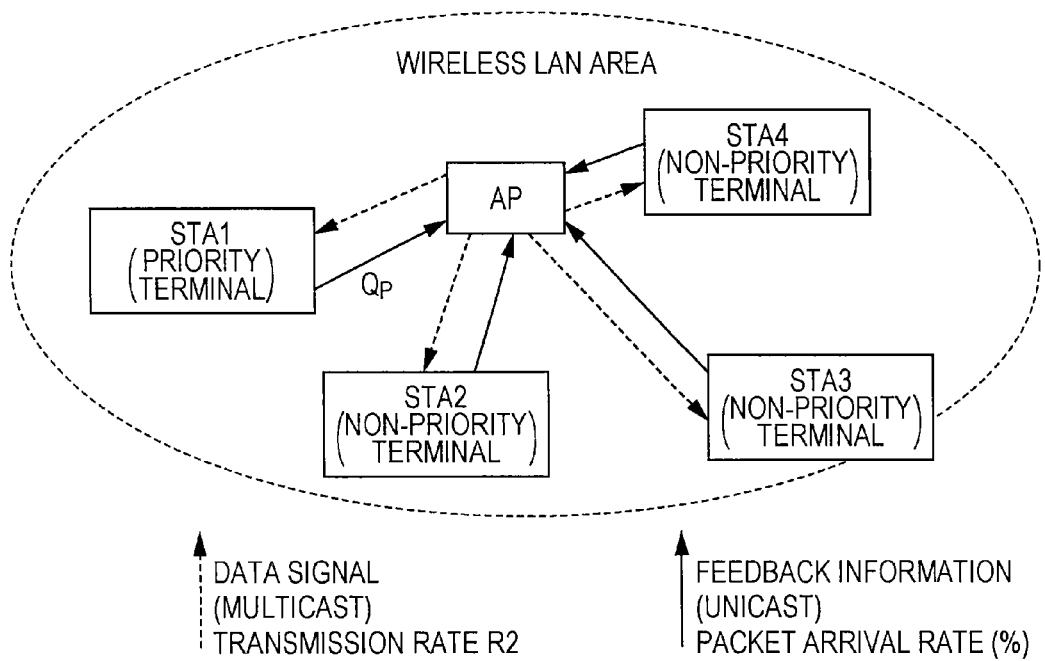
FIG. 4 is a view showing a situation of performing multicast transmission of data from the access point to each client stations in the multicast group.

FIG. 4 shows a situation of performing multicast transmission of data from the access point AP to each client station STA1, STA2, STA3, and STA4 in the multicast group. However, the client station STA1 in the drawing is a priority terminal and the other client stations STA2 to STA4 are set as non-priority terminals.

Here, in the client station STA1 which is a priority terminal, the communication quality information represented by the packet arrival rate is set as $Q_P$, the average value of the communication quality information which was acquired from the client stations STA1 to STA4 configuring the multicast group, and the standard deviation is set as σ. Below, according to the processing procedure shown in FIG. 2, a method of determining the multicast transmission rate according to the communication environment is described.

Figure 5:
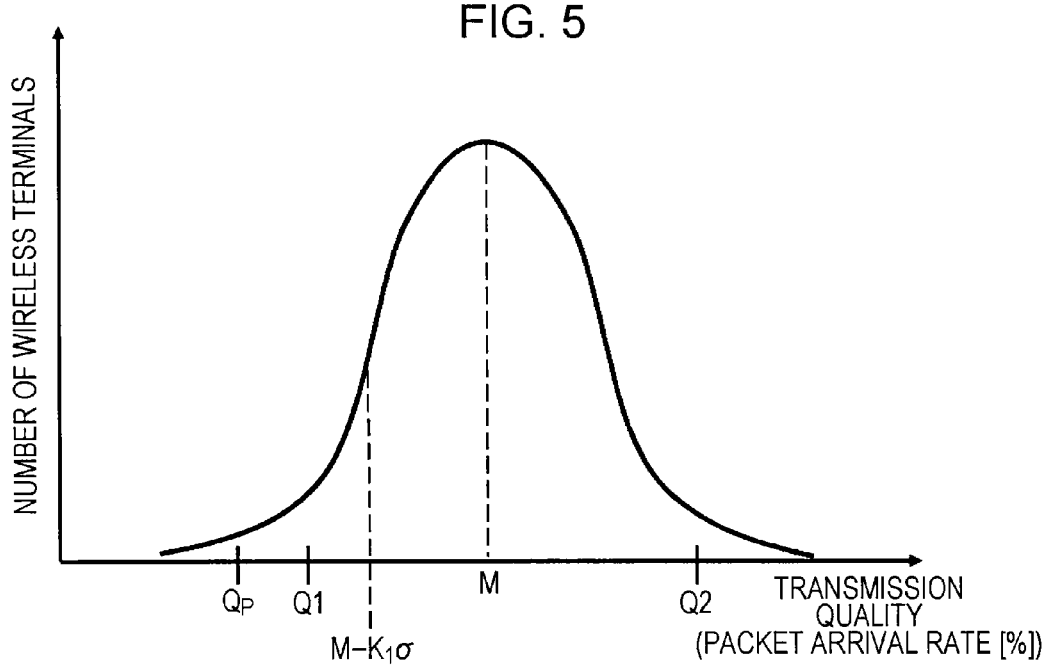
FIG. 5 is a diagram illustrating the distribution of data in a multicast group communication quality with the communication quality information on the horizontal axis, and with the number of client stations on the vertical axis.
Figure 6:
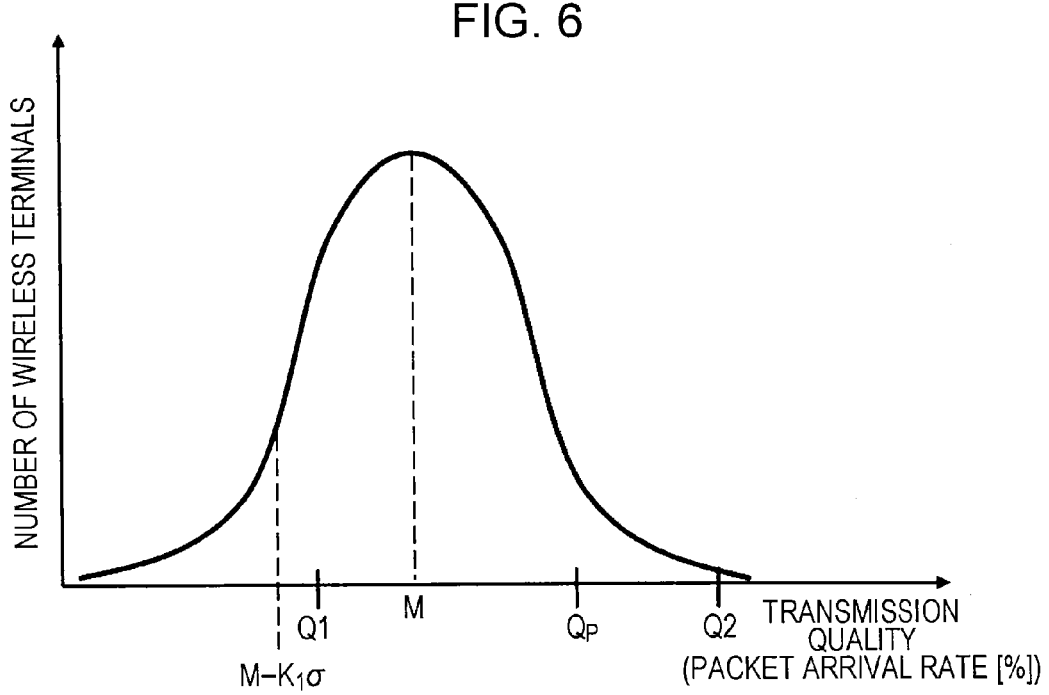
FIG. 6 is a view exemplifying a communication quality data distribution in the multicast group with the communication quality information on the horizontal axis and the number of client stations on the vertical axis.
Figure 7:
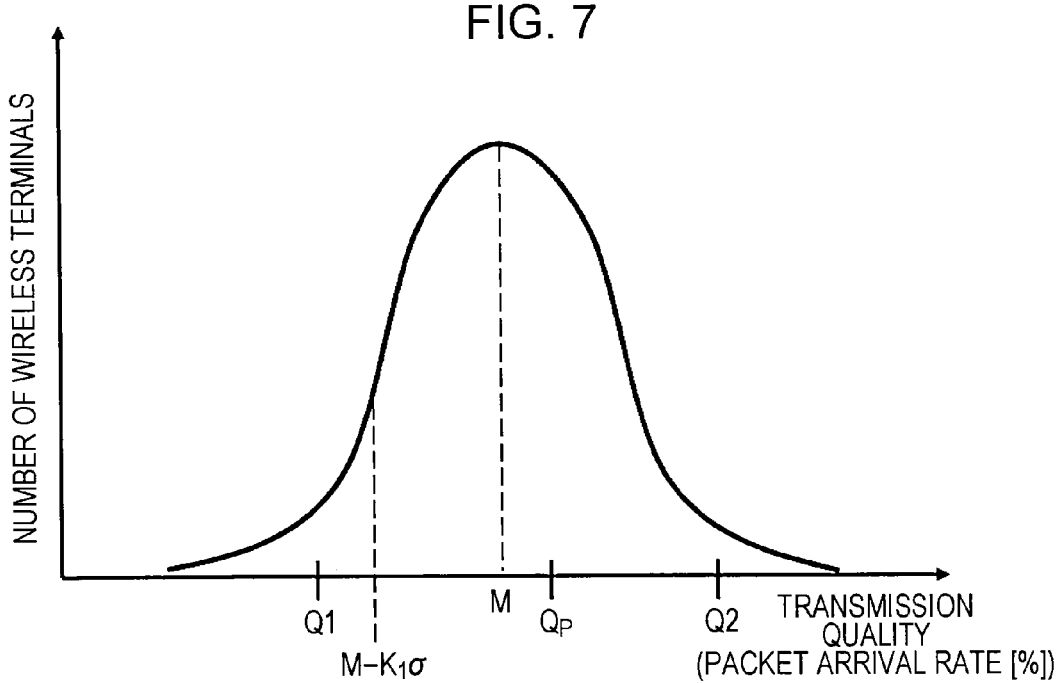
FIG. 7 is a view exemplifying a communication quality data distribution in the multicast group with the communication quality information on the horizontal axis and the number of client stations on the vertical axis.
Figure 8:
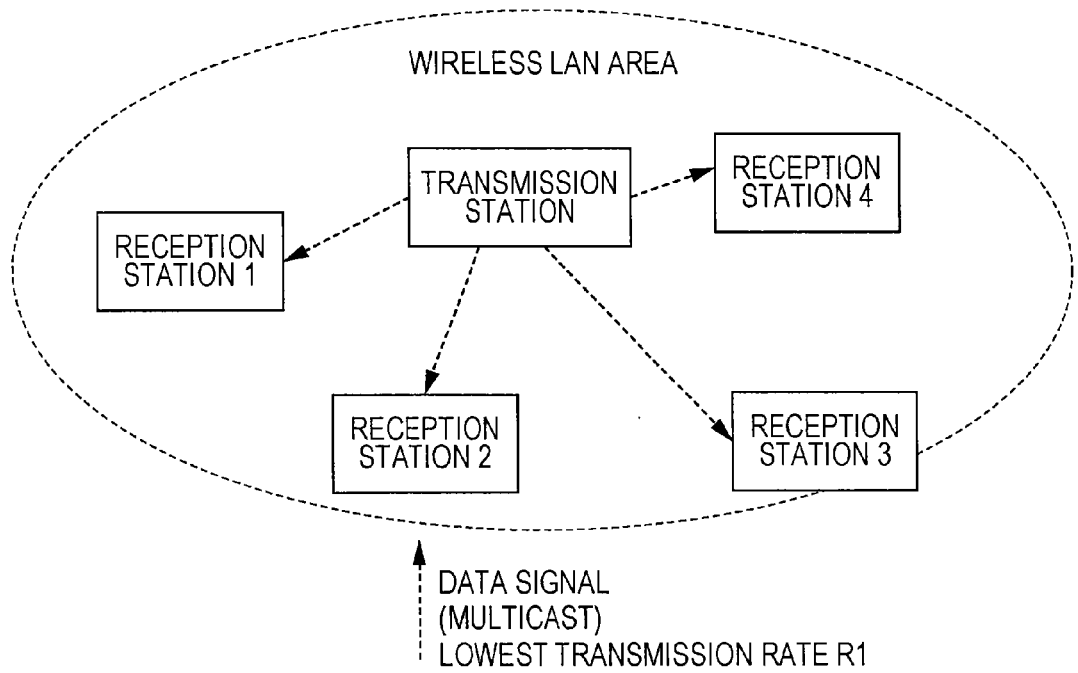
FIG. 8 is a view showing a situation of performing multicast transmission from one multicast transmission station to a plurality of multicast reception stations.
Figure 9:
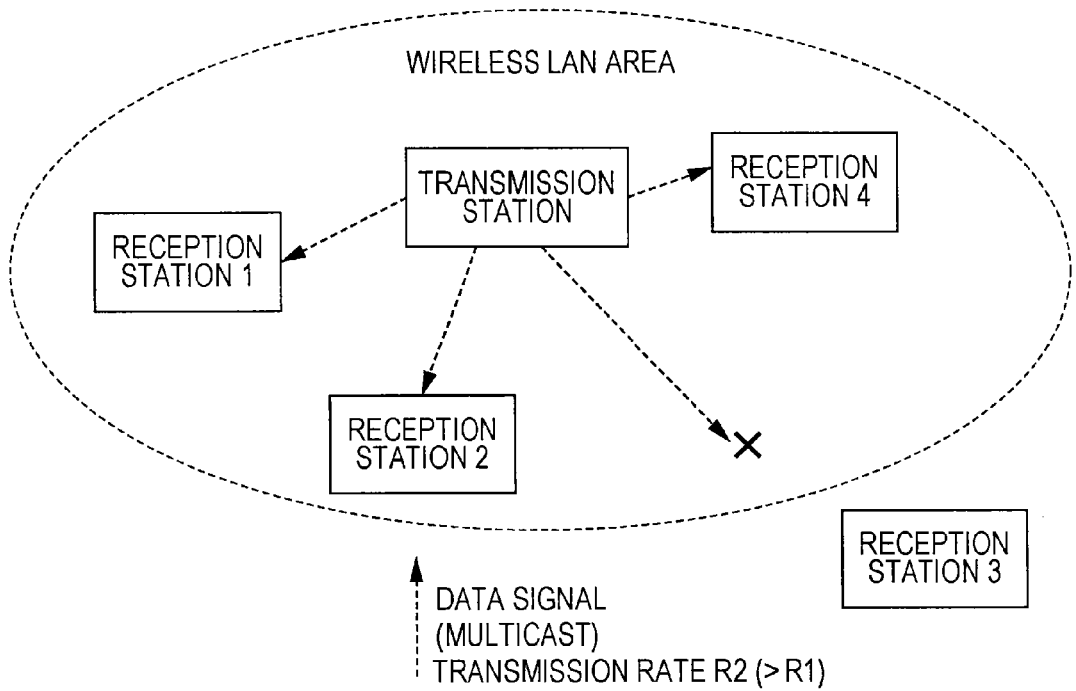
FIG. 9 is a view showing a situation of performing multicast transmission from one transmission station to a plurality of reception stations at a transmission rate R2 (R2>R1) higher than a lowest transmission rate R1.

In FIGS. 5 to 7, communication quality data distributions in the multicast group are respectively exemplified with the communication quality information on the horizontal axis and the number of client stations on the vertical axis.

In the example shown in FIG. 5, the communication quality $Q_P$ in the client station STA1 which is a priority terminal is less than a predetermined value Q1, which corresponds to Yes in step S204 in the flowchart shown in FIG. 2. Accordingly, in order to prioritize the acquisition of the feedback information from the priority terminals, the multicast transmission rate control unit 105 sets the multicast transmission rate only one stage lower (step S208) upon determining that the currently set multicast transmission rate is not the lowest rate (No in step S207).

Further, in the example shown in FIG. 6, in the multicast group, M-$K_1$σ is less than the predetermined value Q1, which corresponds to Yes in step S206 in the flowchart shown in FIG. 2. Therefore, in consideration of the acquisition of feedback from non-priority terminals as well as priority terminals, the multicast transmission rate control unit 105 sets the multicast transmission rate only one stage lower (step S208) upon determining that the currently set multicast transmission rate is not the lowest rate (No in step S207).

Further, in the example shown in FIG. 7, the communication quality $Q_P$ in the client station STA1 which is a priority terminal is equal to or more than a predetermined value Q1 and M-$K_1$σ in the multicast group is equal to or more than a predetermined value Q1, which corresponds to No in step S206 in the flowchart shown in FIG. 2, whereby it is determined that the variation in the communication quality of the non-priority terminals is small. Therefore, the multicast transmission rate control unit 105 does not deteriorate the multicast transmission rate.

In this manner, control, in which the access point AP transmits data by multicast and the multicast transmission rate is determined according to feedback information, is periodically performed at a predetermined cycle. Thus, even in a case where the client stations in the multicast group move and vary in communication quality, the access point AP may select an optimal multicast transmission rate according to the situation at that moment. Thus, even in a case where deterioration occurs in the communication quality at a part of the non-priority terminals, it is possible to maintain high transmission efficiency in the whole system without deteriorating the multicast transmission rate with respect to many other client stations in a favorable communication environment.

In addition, the technology of the present disclosure may adopt the following configuration.

(1) A communication apparatus comprising: an interface that receives, from a plurality of other communication apparatuses, information indicating communication quality of a multicast transmission transmitted from the communication apparatus to each of the plurality of other communication apparatuses; and a processor that controls a multicast transmission rate to be lowered if a communication quality of a first one of the plurality of other communication apparatuses is less than a predetermined threshold and a communication quality of a second one of the other plurality of other communication apparatuses is greater than the predetermined value.

(2) The communication apparatus of (1), wherein the information indicating communication quality corresponds to a packet loss rate (PLR).

(3) The communication apparatus of (1) or (2), wherein the information indicating communication quality corresponds to a received signal strength indication (RSSI).

(4) The communication apparatus of any one of (1) to (3), wherein the information indicating communication quality corresponds to a communication quality index that represents a plurality of communication quality parameters.

(5) The communication apparatus of any one of (1) to (4), wherein the processor controls the interface to transmit a pseudo-training signal to each of the plurality of other communication apparatuses.

(6) The communication apparatus of (5), wherein the processor controls the interface to transmit the pseudo-random training signal to each of the plurality of other communication apparatuses at predetermined intervals.

(7) The communication apparatus of (5) or (6), wherein the information indicating communication quality received from the plurality of other communication apparatuses is based on the pseudo-random training signal.

(8) The communication apparatus of any one of (1) to (7), further comprising: a memory that stores information indicating that the plurality of other communication apparatuses are part of a same multicast group.

(9) The communication apparatus of any one of (1) to (8), wherein when the processor determines that the communication quality of the first one of the plurality of other communication apparatuses is greater than or equal to the predetermined threshold, the processor determines a parameter representative of the communication quality of all of the plurality of other communication apparatuses.

(10) The communication apparatus of (9), wherein when the processor determines that the parameter representative of the communication quality of all of the plurality of other communication apparatuses is less than the predetermined threshold, the processor controls the multicast transmission rate to be lowered.

(11) The communication apparatus of (9) or (10) wherein, when the processor determines that the parameter representative of the communication quality of all of the plurality of other communication apparatuses is less than the predetermined threshold, the processor controls the multicast transmission rate to be lowered unless the multicast transmission rate is set at its lowest rate in which case the processor controls the multicast transmission rate to remain at the lowest rate.

(12) The communication apparatus of any one of (9) to (11), wherein when the processor determines that the parameter representative of the communication quality of all of the plurality of other communication apparatuses is greater than or equal to the predetermined threshold, the processor compares the communication quality of the first one of the plurality of other communication apparatuses to a second threshold value.

(13) The communication apparatus of (12), wherein when a result of the comparing indicates that the communication quality of the first one of the plurality of other communication apparatuses is less than the second threshold value, the processor controls the multicast transmission rate to be unchanged.

(14) The communication apparatus of (12) or (13), wherein when a result of the comparing indicates that the communication quality of the first one of the plurality of other communication apparatuses is greater than or equal to the second threshold value, the processor compares the parameter representative of the communication quality of all of the plurality of other communication apparatuses to the second threshold value.

(15) The communication apparatus of (14), wherein when a result of the comparing indicates that the parameter representative of the communication quality of all of the plurality of other communication apparatuses is less than the second threshold value, the processor controls the multicast transmission rate to be unchanged.

(16) The communication apparatus of (14) or (15), wherein when a result of the comparing indicates that the parameter representative of the communication quality of all of the plurality of other communication apparatuses is greater than or equal to the second threshold value, the processor controls the multicast transmission rate to be increased.

(17) A method performed by a communication apparatus, the method comprising: receiving, from a plurality of other communication apparatuses, information indicating communication quality of a multicast transmission transmitted from the communication apparatus to each of the plurality of other communication apparatuses; and controlling a multicast transmission rate to be lowered if a communication quality of a first one of the plurality of other communication apparatuses is less than a predetermined threshold and a communication quality of a second one of the other plurality of other communication apparatuses is greater than the predetermined value.

(18) A non-transitory computer-readable medium including computer program instructions, which when executed by a communication apparatus, cause the communication apparatus to perform a method comprising: receiving, from a plurality of other communication apparatuses, information indicating communication quality of a multicast transmission transmitted from the communication apparatus to each of the plurality of other communication apparatuses; and controlling a multicast transmission rate to be lowered if a communication quality of a first one of the plurality of other communication apparatuses is less than a predetermined threshold and a communication quality of a second one of the other plurality of other communication apparatuses is greater than the predetermined value.

(19) A communication apparatus comprising: an interface that receives a multicast transmission from a second communication apparatus; a processor that determines information indicating communication quality of the multicast transmission received from the second communication apparatus, wherein the interface transmits the information to the second communication apparatus, which lowers a multicast transmission rate if the communication quality of the communication apparatus is less than a predetermined value and a communication quality reported by a third communication apparatus to the second communication apparatus is greater than the predetermined value.

(20) A method performed by a communication apparatus, the method comprising: receiving a multicast transmission from a second communication apparatus; determining information indicating communication quality of the multicast transmission received from the second communication apparatus; and transmitting the information to the second communication apparatus, which lowers a multicast transmission rate if the communication quality of the communication apparatus is less than a predetermined value and a communication quality reported by a third communication apparatus to the second communication apparatus is greater than the predetermined value.

(21) A non-transitory computer-readable medium including computer program instructions, which when executed by a communication apparatus, cause the communication apparatus to perform a method comprising: receiving a multicast transmission from a second communication apparatus; determining information indicating communication quality of the multicast transmission received from the second communication apparatus; and transmitting the information to the second communication apparatus, which lowers a multicast transmission rate if the communication quality of the communication apparatus is less than a predetermined value and a communication quality reported by a third communication apparatus to the second communication apparatus is greater than the predetermined value.

(22) A communication system comprising: a plurality of first communication apparatuses that each receive a multicast transmission from a second communication apparatus; determine information indicating communication quality of the multicast transmission received from the second communication apparatus; and transmit the information to the second communication apparatus; and the second communication apparatus that receives the information from each of the plurality of first communication apparatuses; and controls a multicast transmission rate to be lowered if a communication quality of a first one of the plurality of first communication apparatuses is less than a predetermined threshold and a communication quality of a second one of the plurality of first communication apparatuses is greater than the predetermined value.

It should be understood by those skilled in the art that various modifications, combinations, sub-combinations and alterations may occur depending on design requirements and other factors insofar as they are within the scope of the appended claims or the equivalents thereof.

What is claimed is:

1. A communication apparatus comprising:
   an interface that receives, from a plurality of other communication apparatuses, information indicating communication quality of a multicast transmission transmitted from the communication apparatus to each of the plurality of other communication apparatuses; and
   a processor that controls a multicast transmission rate to be lowered if a communication quality of a first one of the plurality of other communication apparatuses is less than a predetermined threshold and a communication quality of a second one of the other plurality of other communication apparatuses is greater than the predetermined value.

2. The communication apparatus of claim 1, wherein the information indicating communication quality corresponds to a packet loss rate (PLR).

3. The communication apparatus of claim 1, wherein the information indicating communication quality corresponds to a received signal strength indication (RSSI).

4. The communication apparatus of claim 1, wherein the information indicating communication quality corresponds to a communication quality index that represents a plurality of communication quality parameters.

5. The communication apparatus of claim 1, wherein the processor controls the interface to transmit a pseudo-training signal to each of the plurality of other communication apparatuses.

6. The communication apparatus of claim 5, wherein the processor controls the interface to transmit the pseudo-random training signal to each of the plurality of other communication apparatuses at predetermined intervals.

7. The communication apparatus of claim 5, wherein the information indicating communication quality received from the plurality of other communication apparatuses is based on the pseudo-random training signal.

8. The communication apparatus of claim 1, further comprising:
   a memory that stores information indicating that the plurality of other communication apparatuses are part of a same multicast group.

9. The communication apparatus of claim 1, wherein when the processor determines that the communication quality of the first one of the plurality of other communication apparatuses is greater than or equal to the predetermined threshold, the processor determines a parameter representative of the communication quality of all of the plurality of other communication apparatuses.

10. The communication apparatus of claim 9, wherein when the processor determines that the parameter representative of the communication quality of all of the plurality of other communication apparatuses is less than the predetermined threshold, the processor controls the multicast transmission rate to be lowered.

11. The communication apparatus of claim 9, wherein, when the processor determines that the parameter representative of the communication quality of all of the plurality of other communication apparatuses is less than the predetermined threshold, the processor controls the multicast transmission rate to be lowered unless the multicast transmission rate is set at its lowest rate in which case the processor controls the multicast transmission rate to remain at the lowest rate.

12. The communication apparatus of claim 9, wherein when the processor determines that the parameter representative of the communication quality of all of the plurality of other communication apparatuses is greater than or equal to the predetermined threshold, the processor compares the communication quality of the first one of the plurality of other communication apparatuses to a second threshold value.

13. The communication apparatus of claim 12, wherein when a result of the comparing indicates that the communication quality of the first one of the plurality of other communication apparatuses is less than the second threshold value, the processor controls the multicast transmission rate to be unchanged.

14. The communication apparatus of claim 12, wherein when a result of the comparing indicates that the communication quality of the first one of the plurality of other communication apparatuses is greater than or equal to the second threshold value, the processor compares the parameter representative of the communication quality of all of the plurality of other communication apparatuses to the second threshold value.

15. The communication apparatus of claim 14, wherein when a result of the comparing indicates that the parameter representative of the communication quality of all of the plurality of other communication apparatuses is less than the second threshold value, the processor controls the multicast transmission rate to be unchanged.

16. The communication apparatus of claim 14, wherein when a result of the comparing indicates that the parameter representative of the communication quality of all of the plurality of other communication apparatuses is greater than or equal to the second threshold value, the processor controls the multicast transmission rate to be increased.

17. A method performed by a communication apparatus, the method comprising:
   receiving, from a plurality of other communication apparatuses, information indicating communication quality of a multicast transmission transmitted from the communication apparatus to each of the plurality of other communication apparatuses; and
   controlling a multicast transmission rate to be lowered if a communication quality of a first one of the plurality of other communication apparatuses is less than a predetermined threshold and a communication quality of a second one of the other plurality of other communication apparatuses is greater than the predetermined value.

18. A non-transitory computer-readable medium including computer program instructions, which when executed by a communication apparatus, cause the communication apparatus to perform a method comprising:
   receiving, from a plurality of other communication apparatuses, information indicating communication quality of a multicast transmission transmitted from the communication apparatus to each of the plurality of other communication apparatuses; and
   controlling a multicast transmission rate to be lowered if a communication quality of a first one of the plurality of other communication apparatuses is less than a predetermined threshold and a communication quality of a second one of the other plurality of other communication apparatuses is greater than the predetermined value.

19. A communication apparatus comprising:
   an interface that receives a multicast transmission from a second communication apparatus;
   a processor that determines information indicating communication quality of the multicast transmission received from the second communication apparatus, wherein
   the interface transmits the information to the second communication apparatus, which lowers a multicast transmission rate if the communication quality of the communication apparatus is less than a predetermined value and a communication quality reported by a third communication apparatus to the second communication apparatus is greater than the predetermined value.

20. A method performed by a communication apparatus, the method comprising:
   receiving a multicast transmission from a second communication apparatus;
   determining information indicating communication quality of the multicast transmission received from the second communication apparatus; and
   transmitting the information to the second communication apparatus, which lowers a multicast transmission rate if the communication quality of the communication apparatus is less than a predetermined value and a communication quality reported by a third communication apparatus to the second communication apparatus is greater than the predetermined value.

* * * * *